(12) United States Patent
Sun

(10) Patent No.: US 9,161,336 B2
(45) Date of Patent: *Oct. 13, 2015

(54) METHOD AND APPARATUS FOR MULTI-CARRIER ALLOCATION

(71) Applicants: KONINKLIJKE PHILIPS ELECTRONICS N.V., Eindhoven (NL); SHARP CORPORATION, Osaka (JP)

(72) Inventor: Yanmeng Sun, Shanghai (CN)

(73) Assignees: Koninklijke Philips N.V., Eindhoven (NL); Sharp Corporation, Osaka (JP)

( * ) Notice: Subject to any disclaimer, the term of this patent is extended or adjusted under 35 U.S.C. 154(b) by 101 days.

This patent is subject to a terminal disclaimer.

(21) Appl. No.: 13/802,959

(22) Filed: Mar. 14, 2013

(65) Prior Publication Data

US 2013/0201945 A1 Aug. 8, 2013

Related U.S. Application Data

(63) Continuation of application No. 12/300,237, filed as application No. PCT/IB2007/051486 on Apr. 24, 2007, now Pat. No. 8,416,800.

(30) Foreign Application Priority Data

May 11, 2006 (CN) .......................... 2006 1 0079955

(51) Int. Cl.
*H04W 72/04* (2009.01)
*H04W 72/08* (2009.01)
*H04L 5/00* (2006.01)

(52) U.S. Cl.
CPC .............. *H04W 72/04* (2013.01); *H04L 5/0044* (2013.01); *H04W 72/085* (2013.01); *H04L 5/0007* (2013.01); *H04L 5/0048* (2013.01); *H04W 72/042* (2013.01)

(58) Field of Classification Search
CPC .............. H04W 72/04; H04W 72/044; H04W 72/0413; H04W 88/02; H04W 72/0406; H04W 72/0453; H04W 72/085; H04L 5/0094; H04L 25/0202; H04L 5/0057
USPC ........ 370/252, 280, 329; 455/67.11; 375/131; 714/762
See application file for complete search history.

(56) References Cited

U.S. PATENT DOCUMENTS

2004/0081123 A1   4/2004  Krishnan et al.
2004/0258134 A1*  12/2004 Cho et al. ...................... 375/131

(Continued)

FOREIGN PATENT DOCUMENTS

| JP | 2005101730 A | 4/2005 |
| WO | 2004091126 A1 | 10/2004 |
| WO | 2005089006 A1 | 9/2005 |
| WO | 2005109837 A1 | 11/2005 |
| WO | 2006034577 A1 | 4/2006 |

OTHER PUBLICATIONS

Vook et al, "Uplink Channel Sounding for TDD OFDMA", IEEE 802.16, Broadband Wireless Access Working Group, Aug. 31, 2004, pp. 2-11, XP02481418.

(Continued)

*Primary Examiner* — Kwang B Yao
*Assistant Examiner* — Syed M Bokhari

(57) ABSTRACT

In order to improve efficiency for sub-carrier allocation in a TDM multi-carrier system, the invention provides a novel frame structure and corresponding method and apparatus. During a centralized short period, each terminal sends a probe message including a predefined sequence to a network device and the network device estimates the channel characteristics for each sub-carrier with respect to each terminal by estimating the received probe message. In this way, sub-carrier allocation can be improved and sub-carriers with good channel characteristics are allocated to appropriate terminals.

23 Claims, 8 Drawing Sheets

(56) References Cited

U.S. PATENT DOCUMENTS

| | | | | |
|---|---|---|---|---|
| 2005/0249127 | A1* | 11/2005 | Huo et al. | 370/252 |
| 2006/0013151 | A1* | 1/2006 | Lee et al. | 370/280 |
| 2006/0025079 | A1* | 2/2006 | Sutskover et al. | 455/67.11 |
| 2007/0079215 | A1* | 4/2007 | Kim et al. | 714/762 |
| 2007/0189404 | A1 | 8/2007 | Baum et al. | |
| 2009/0004971 | A1 | 1/2009 | Dateki et al. | |
| 2012/0069796 | A1 | 3/2012 | Casaccia et al. | |

OTHER PUBLICATIONS

Vook et al, "Signaling Methodolgies to Suopport Closed-Loop Transmit Processing in TDD OFDMA", IEEE C 802.16E04/103, May 15, 2005, p. 1-22.

* cited by examiner

|     | TS1 | TS2 | TS3 | TS4 |
| --- | --- | --- | --- | --- |
| SC1 | A | B | C |   |
| SC2 | A | B | C |   |
| SC3 | A | B | C |   |
| SC4 | A | B | C |   |
| SC5 | A | B | C |   |
| SC6 | A | B | C |   |
| SC7 | A | B | C |   |
| SC8 | A | B | C |   |

→ Time

FIG. 3A

|     | TS1 | TS2 | TS3 | TS4 |
| --- | --- | --- | --- | --- |
| SC1 | A | C |   |   |
| SC2 | A | C |   |   |
| SC3 | B | A | C |   |
| SC4 | B | A | C |   |
| SC5 | B |   | A | C |
| SC6 | C | B | A |   |
| SC7 | C | B |   | A |
| SC8 | C | B |   | A |

→ Time

FIG. 3B

|     | TS1 | TS2 | TS3 | TS4 |
| --- | --- | --- | --- | --- |
| SC1 | A, B and C |   |   |   |
| SC2 | A, B and C |   |   |   |
| SC3 | A, B and C |   |   |   |
| SC4 | A, B and C |   |   |   |
| SC5 | A, B and C |   |   |   |
| SC6 | A, B and C |   |   |   |
| SC7 | A, B and C |   |   |   |
| SC8 | A, B and C |   |   |   |

→ Time

FIG. 4A

|     | TS1 | TS2 | TS3 | TS4 |
| --- | --- | --- | --- | --- |
| SC1 | A   |     | C   |     |
| SC2 | A   |     |     |     |
| SC3 | A   | B   |     |     |
| SC4 | A   | B   |     |     |
| SC5 | A   | B   |     |     |
| SC6 | A   | B   |     |     |
| SC7 | A   | B   |     |     |
| SC8 | A   | B   |     |     |

FIG. 4B

|     | TS1 | TS2 | TS3 | TS4 |
| --- | --- | --- | --- | --- |
| SC1 | A   |     |     |     |
| SC2 | A   |     |     |     |
| SC3 | B   |     |     |     |
| SC4 | B   |     |     |     |
| SC5 | B   |     |     |     |
| SC6 | C   |     |     |     |
| SC7 | C   |     |     |     |
| SC8 | C   |     |     |     |

FIG. 4C

|     | TS1 | TS2 | TS3 | TS4 |
| --- | --- | --- | --- | --- |
| SC1 |     |     |     |     |
| SC2 | A   |     |     |     |
| SC3 | A   |     |     |     |
| SC4 | B   |     |     |     |
| SC5 |     |     |     |     |
| SC6 |     | C   |     |     |
| SC7 |     | C   |     |     |
| SC8 |     | C   |     |     |

FIG. 4D

|     | TS1 | TS2 | TS3 | TS4 |
| --- | --- | --- | --- | --- |
| SC1 |     |     |     | A   |
| SC2 | A   | A   | A   | A   |
| SC3 | A   | A   | A   | A   |
| SC4 | A   |     |     | A   |
| SC5 | B   | B   | B   | B   |
| SC6 | B   | B   | B   | B   |
| SC7 |     |     |     | A   |
| SC8 |     |     |     | A   |

FIG. 5

|     | TS1 | TS2 | TS3 | TS4 |
| --- | --- | --- | --- | --- |
| SC1 |     |     |     | A   |
| SC2 | A   | A   | A   | A   |
| SC3 | A   |     |     | A   |
| SC4 |     |     |     |     |
| SC5 | B   | B   | B   | B   |
| SC6 | B   | B   | B   | B   |
| SC7 |     |     |     |     |
| SC8 | C   | C   |     |     |

FIG. 6A

|     | TS1 | TS2 | TS3 | TS4 |
| --- | --- | --- | --- | --- |
| SC1 | C   |     | C   |     |
| SC2 | A   |     | A   |     |
| SC3 |     | A   |     | A   |
| SC4 | B   | B   |     | C   |
| SC5 | B   |     | B   | B   |
| SC6 | B   | B   |     | B   |
| SC7 | B   |     | B   | B   |
| SC8 |     | C   |     | C   |

FIG. 6B

METHOD AND APPARATUS FOR MULTI-CARRIER ALLOCATION

The present invention relates generally to communication systems, and more particularly, to a method and apparatus for multi-carrier allocation in TDM (Time Division Multiplex) multi-carrier systems.

With rapid development in communication systems, MC (Multi-Carrier) technology has drawn great interests from the industry and the academia due to its advantages in anti-interference, parallel transmission, resource allocation optimization and etc.

On the one hand, a broadband system may distribute a signal over multiple carriers by using MC technology, adopts data interleaving and carrier interleaving, to mitigate frequency-selective fading.

On the other hand, there is generally more downlink traffic than uplink traffic in a wireless communication system. Typically, for a downlink transmission, a transmitter may establish information association between multiple carriers by using carrier interleaving, FEC (Forward Error Correction) or the like. The receiver may recover information lost during the transmission by using the information association. Furthermore, the downlink traffic is usually distributed across a broader frequency band and thus has a stronger capability for mitigating frequency-selective fading. In contrast, for an uplink transmission, it's very difficult to coordinate multiple users to establish information association with techniques such as carrier interleaving, and each user's uplink traffic only occupies a narrower bandwidth. Accordingly, the uplink traffic is more vulnerable to frequency-selective fading.

Typically, a sub-carrier may show different channel characteristics for different terminals as the space and the time vary. Due to the difference in spatial characteristics, such as propagation paths, barriers and so on, a sub-carrier may show frequency-selective fading for a set of terminals and good channel characteristics for another set of terminals at a certain time. Additionally, a sub-carrier may alternate, with time aging, between a poor channel subjected to frequency-selective fading and a good channel suitable for transmission as the same terminal is concerned. Therefore, it will be a method for enhancing system performance to allocate different sub-carriers to different terminals in a multi-carrier system based on the fact that different sub-carriers demonstrate different channel characteristics for different terminals.

A method for performing transmissions between a plurality of mobile terminals and a base station over a plurality of sub-carriers is described in a U.S. patent application with No. 20050249127 A1 published on Nov. 10, 2005, filed by Lucent Technologies Inc. In this method, the channel quality of at least a portion of sub-carriers for each mobile terminal is estimated and a respective set of sub-carriers is selected for each mobile terminal based on the estimation and the allocation is informed to each mobile terminal; and each mobile terminal performs transmission over its allocated set of sub-carriers.

It is, therefore, necessary to provide a method for optimization of carrier allocation and improvement of system performance in a TDM multi-carrier system.

The invention provides a frame structure, method and apparatus for optimization of sub-carrier allocation in a TDM multi-carrier system.

The invention provides a frame structure suitable for use in a TDM multi-carrier system, with which a network device may optimize sub-carrier allocation to improve performance for the system and the terminal.

According to an embodiment of the invention, there is provided a frame structure suitable for use in a TDM multi-carrier system, the frame structure comprising: a first period, during which a terminal transmits a probe message and a network device transmits an allocation message, wherein the network device obtains the allocation message by estimating the probe message, the probe message including information about at least one of a set of uplink sub-carriers and a set of downlink sub-carriers allocated to the terminal; and a second period, during which uplink traffic and/or downlink traffic are transmitted between the terminal and the network device over the set of uplink sub-carriers and/or the set of downlink sub-carriers.

Wherein the first period further comprises an uplink transmission period, during which the terminal transmits the probe message to the network device; and a downlink transmission period, during which the network device transmits the allocation message to the terminal.

Wherein the second period further comprises a downlink traffic transmission period, during which the network device transmits downlink traffic to the terminal; and an uplink traffic transmission period, during which the terminal transmits uplink traffic to the network device.

The basic idea of the frame structure is to establish a centralized first period, during which the network device estimates the probe message sent from each terminal to estimate the channel characteristics for each sub-carrier with respect to different terminals and allocates appropriate sub-carriers to each terminal based on the estimation result for the purpose of optimizing sub-carrier allocation. Further optionally, the network device and the terminal may choose an appropriate coding and modulation mode based on the estimation result for each sub-carrier, so as to further improve the system performance and the data transmission rate for the terminal.

The invention provides methods for use in a terminal and a network device respectively to allocate sub-carriers in TDM multi-carrier systems. These methods can take advantage of the frame structure proposed in the invention.

According to an embodiment of the invention, there is provided a method for use in a terminal to allocate sub-carriers in a TDM multi-carrier system, comprising: transmitting a probe message to a network device over a first set of sub-carriers during an uplink transmission period of a first period, wherein the probe message comprises a predefined sequence for channel estimation and is used by the network device to perform channel estimation for the first set of sub-carriers; and receiving an allocation message sent from the network device during a downlink transmission period of the first period, to obtain information about at least one of a set of uplink sub-carriers and a set of downlink sub-carriers allocated to the terminal, wherein the allocation message includes the result for channel estimation performed on the probe message by the network device.

To decrease the influence from potential unexpected frequency-selective fading on the uplink transmission, a method is further provided according to an embodiment of the invention, in which the mobile terminal may select a second set of sub-carriers from the allocated set of uplink sub-carriers in a predefined frequency-hop mode, and transmit uplink traffic over the second set of sub-carriers.

According to an embodiment of the invention, there is provided a method for use in a network device to allocate sub-carriers in a TDM multi-carrier system, comprising receiving a probe message sent from a terminal during an uplink transmission period of a first period; estimating the probe message to obtain an allocation message for the terminal, wherein the allocation message includes information about at least one of a set of uplink sub-carriers and a set of downlink sub-carriers allocated to the terminal; and transmitting the allocation message to the terminal during an downlink transmission period of the first period.

The network device processes the probe message to estimate the channel characteristics for a first set of sub-carriers over which the probe message is transmitted with respect to the terminal and generates a sub-carrier allocation result according to the channel characteristics.

The terminal and the network device transmit downlink traffic and receive uplink traffic over the allocated set of downlink sub-carriers and the allocated set of uplink sub-carriers during the corresponding second period.

According to embodiments of the invention, a terminal and a network device to use the methods proposed in the invention are provided.

Wherein the terminal comprises a transmitter for transmitting a probe message and a receiver for receiving an allocation message. Optionally, the terminal further comprises a first selector, an extractor and/or a second selector. The first selector is configured to select a first set of sub-carriers the terminal intends to use, the extractor is configured to extract information about the allocated set of uplink/downlink sub-carriers from the allocation message, and the second selector is configured to select a second set of sub-carriers from the set of uplink sub-carriers. The transmitter and the receiver are further configured to transmit uplink traffic and receive downlink traffic, respectively.

Wherein the network device comprises a receiver for receiving a probe message, an estimator for processing the probe message to estimate sub-carriers, an allocator for allocating a set of sub-carriers and generating an allocation message, and a transmitter for transmitting the allocation message. Wherein the receiver and the transmitter may be further configured to receive uplink traffic and transmit downlink traffic, respectively.

The method proposed in US20050249127A1 has several drawbacks. First, the terminal is involved in estimation for sub-carriers and thus a higher complexity is brought. Second, a feedback channel exists between each mobile terminal and the base station, which increases the system complexity and introduces additional delay. Third, the frame structure in conventional radio systems is used and it's very hard for the base station to obtain, in a short time, the global frequency response characteristics associated with all sub-carriers for all mobile terminals. In this case, there is a possibility that the terminal cannot be allocated most suitable sub-carriers.

The frame structure, method and apparatus proposed in the invention have several advantages. First, the terminal need not estimate the sub-carriers and thus the terminal design is simplified. Second, no dedicated feedback channel is required to be established between each terminal and the network device. Third, by means of a centralized first period, the network device may easily obtain the channel characteristics for different sub-carriers with respect to different terminals within a shorter time period, so as to optimize sub-carrier allocation. Fourth, after being allocated sub-carriers with good channel characteristics, the terminal and the network device may further employ more efficient coding and modulation mode to improve data transmission rates and optimize the performance for the whole system.

Other objects and attainments together with a fuller understanding of the invention will become apparent and be appreciated by referring to the following descriptions and claims taken in conjunction with the accompanying drawings.

FIG. 3A illustrates a schematic diagram in which multiple terminals transmit probe messages during the uplink transmission period of a first period according to an embodiment of the invention;

FIG. 3B illustrates a schematic diagram in which multiple terminals transmit probe messages during the uplink transmission period of a first period according to another embodiment of the invention;

FIG. 4A illustrates a schematic diagram in which a network device transmits allocation messages during the downlink transmission period of a first period according to an embodiment of the invention;

FIG. 4B illustrates a schematic diagram in which a network device transmits allocation messages during the downlink transmission period of a first period according to another embodiment of the invention;

FIG. 4C illustrates a schematic diagram in which a network device transmits allocation messages during the downlink transmission period of a first period according to another embodiment of the invention;

FIG. 4D illustrates a schematic diagram in which a network device transmits allocation messages during the downlink transmission period of a first period according to another embodiment of the invention;

FIG. 5 illustrates a schematic diagram in which a network device transmits downlink traffic over the allocated set of downlink sub-carriers during the downlink traffic transmission period of a second period according to an embodiment of the invention;

FIG. 6A illustrates a schematic diagram in which a terminal transmits uplink traffic over the allocated set of uplink sub-carriers during the uplink traffic transmission period of a second period according to an embodiment of the invention;

FIG. 6B illustrates a schematic diagram in which a terminal transmits uplink traffic over a second set of sub-carriers during the uplink traffic transmission period of a second period according to another embodiment of the invention;

Throughout all the above drawings, like reference numerals will be understood to refer to like, similar or corresponding features or functions.

Figure 1A:
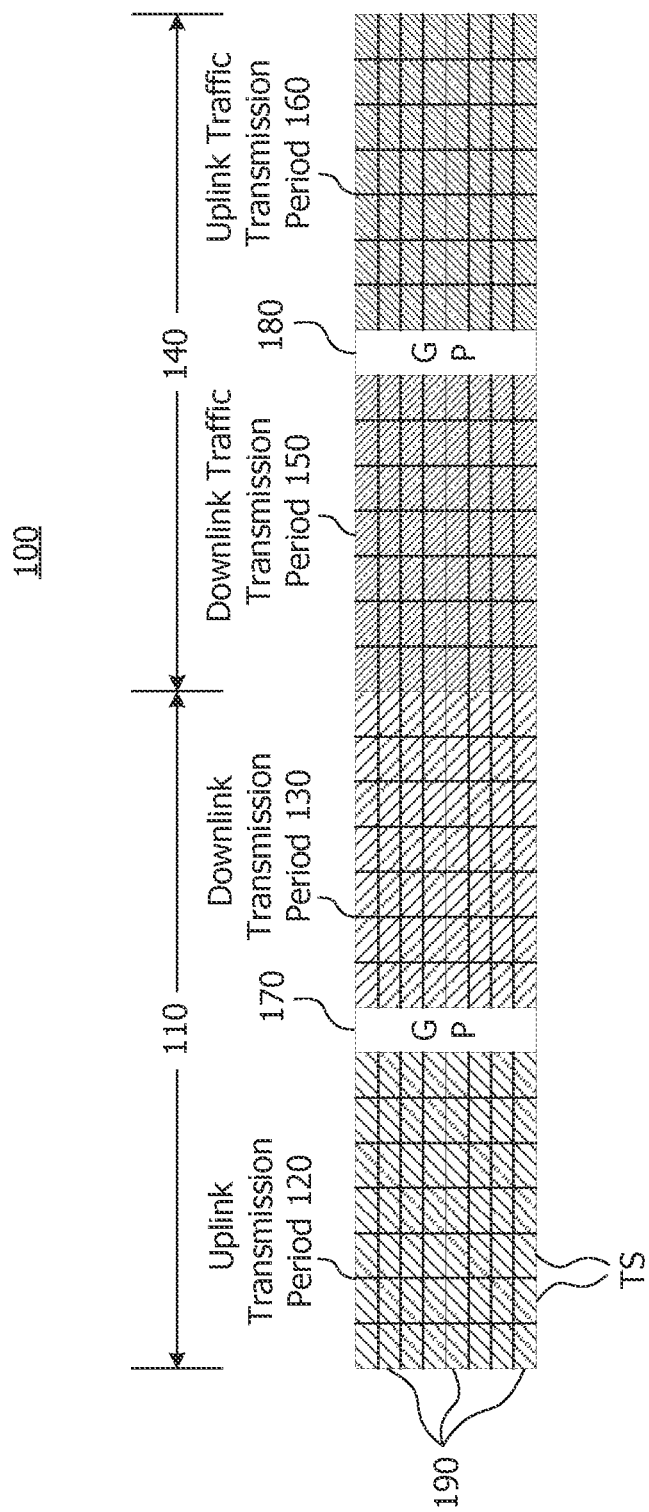
FIG. 1A illustrates a frame structure implemented according to an embodiment of the invention.

Detailed descriptions will be made below to specific embodiments of the present invention taken in conjunction with the accompanying drawings.

In a TDM system, sub-carriers are employed for uplink transmission and downlink transmission alternately. Each sub-carrier may be characterized by multiple channel parameters, some of which vary with variation of time and space. However, the variation in these channel parameters is so slight within a very short time period that its influence on the transmission over the sub-carriers may be ignored. A sub-carrier is regarded as having channel symmetry property if it has identical channel parameters for use in downlink transmission and uplink transmission. By taking advantage of the channel symmetry property for a TDM system, the invention provides a frame structure, method and apparatus for optimization of sub-carrier allocation in a TDM multi-carrier system.

To estimate the channel characteristics for all sub-carriers or a portion of sub-carriers with respect to each terminal within a short period, the invention provides a novel frame structure. The frame structure comprises two parts, a first period and a second period, wherein the first period is used for estimating the channel characteristics for each sub-carrier with respect to each terminal and allocating each terminal a corresponding set of uplink and/or downlink sub-carriers, and the second period is used for uplink and/or downlink traffic transmission between the terminal and a network device over the allocated set of uplink and/or downlink sub-carriers.

Specifically, the first period comprises an uplink transmission period and a downlink transmission period. During the uplink transmission period, each terminal transmits one or more probe messages to the network device over all sub-carriers or a set of sub-carriers that are expected for use in uplink and/or downlink transmission, wherein the probe message generally includes a predefined sequence for estimation of channel characteristics, such as a preamble, or a training sequence etc. During the downlink transmission period, the network device transmits one or more allocation messages to each terminal, wherein the allocation message is generated after the network device obtains the channel characteristics for the corresponding sub-carriers by processing the received probe message, and it includes information about the set of uplink and/or downlink sub-carriers allocated to the terminal.

To protect conversions made between an uplink transmission period and a downlink transmission period, the first period may optionally further comprise a guard period according to an embodiment of the invention, which is inserted between the uplink transmission period and the downlink transmission period. Optionally, the duration of the guard period should not be less than the propagation delay for an electromagnetic wave within a cell in the TDM multi-carrier system and is given by Eq.(1):

$$T_{GP} \geq R/C \quad (1)$$

wherein R is the radius of a cell in the system and C is the speed at which the electromagnetic wave propagates in the medium.

Specifically, the second period comprises a downlink traffic transmission period and an uplink traffic transmission period. During the downlink traffic transmission period, the network device transmits downlink traffic to each terminal over the corresponding set of downlink sub-carriers allocated to each terminal; and during the uplink traffic transmission period, each terminal transmits uplink traffic to the network device over its allocated set of uplink sub-carriers or at least one sub-carrier thereof.

FIG. 1A illustrates a frame structure implemented according to an embodiment of the invention. In a frame 100, a first period 110 comprises an uplink transmission period 120 and a downlink transmission period 130, and a second period 140 comprises a downlink traffic transmission period 150 and an uplink traffic transmission period 160. An optional guard period 170 is inserted between the uplink transmission period 120 and the downlink transmission period 130. An optional guard period 180 may also be inserted between the downlink traffic transmission period 150 and the uplink traffic transmission period 160 and its length may be obtained from Eq.(1). Each transmission period includes one or more timeslots. In each timeslot, multiple sub-carriers 190, such as SC1-8, may be used to transmit information simultaneously. In a CDMA-based system, transmissions for different terminals may be carried on a single sub-carrier by using different spreading codes, so the combination of a single sub-carrier and a single spreading code may be regarded as a sub-carrier. It's to be understood by those skilled in the art that the word "sub-carrier" referred to in the present invention should be construed not narrowly as a specific frequency band in a narrow sense, but as independent radio resources for transmission of data in a communication system, such as a minimum frequency unit in a non-CDMA system, the combination of a frequency band and a spreading code in a CDMA system, or the like.

In the embodiment as shown in FIG. 1A, the first period 110 precedes the data transmission period 140. Each terminal and the network device use the first period in a frame for estimation of sub-carriers and allocation of a set of downlink and/or uplink sub-carriers, and transmit downlink and/or uplink traffic over the allocated set of downlink and/or uplink sub-carriers during the downlink traffic transmission period and/or uplink traffic transmission period in the same frame. The transmission periods 120, 130, 150 and 160 may use other arrangements to attain the same effect.

Figure 1B:
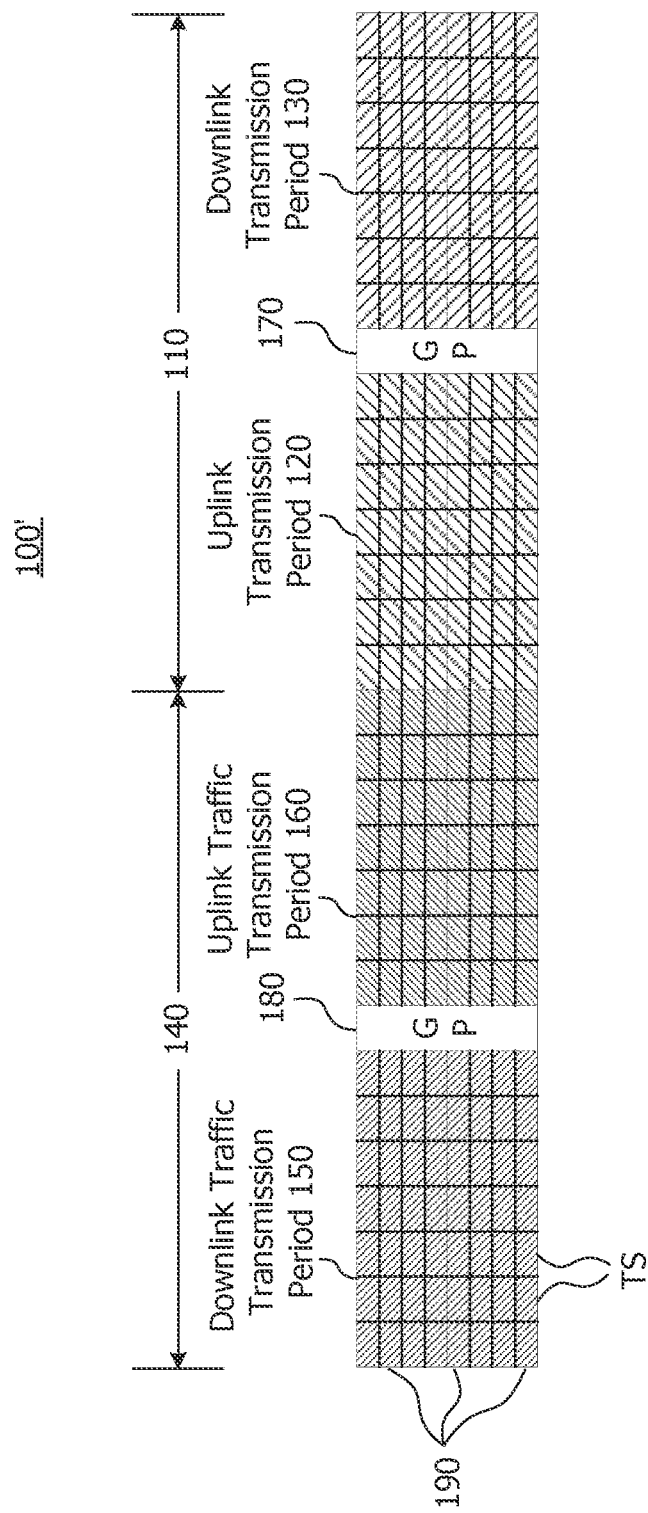
FIG. 1B illustrates a frame structure implemented according to another embodiment of the invention.

FIG. 1B illustrates a frame structure implemented according to another embodiment of the invention. In a frame 100', a second period 140 precedes a first period 110. In a system according to the embodiment, the downlink traffic transmission period 150 and the uplink traffic transmission period 160 in the (N+1)th frame may be used to transmit downlink traffic and uplink traffic respectively over a set of downlink sub-carriers and a set of uplink sub-carriers allocated during the uplink transmission period 120 and the downlink transmission period 130 of the first period in the Nth frame.

By transmitting multiple probe messages over all sub-carriers and estimating the probe messages in a short period, the system may obtain the channel characteristics for each sub-carrier with respect to each terminal in the period. Due to the channel symmetry property of a TDM system, the channel characteristics estimated during the first period is still applicable in the following data transmission period. The duration of the frame is generally not more than the coherent time of the sub-carriers. In the urban pedestrian scenarios adopted by 3GPP, the coherent time of the channels around 2 GHz band is on the order of several milliseconds, which makes the frame structure of the invention applicable.

With the frame structure of the embodiments of the invention, first of all, the terminal is simplified because it no longer needs to estimate the sub-carriers; second, no feedback channel is needed between the terminal and the network device; and third, it is very easy for the system to get the global estimation result and the sub-carrier allocation result.

Figure 2:
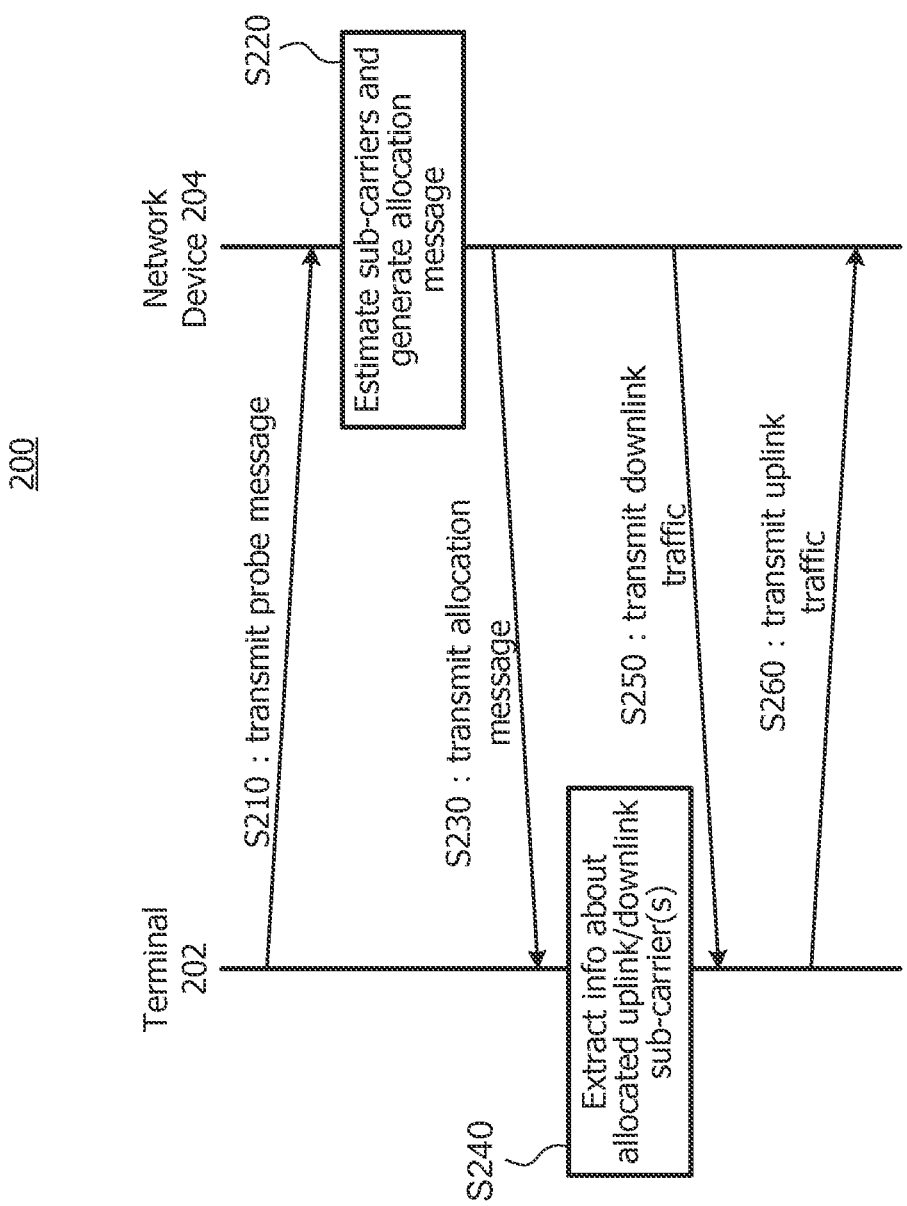
FIG. 2 illustrates a sequence of message exchanges between a terminal and a network device implemented according to an embodiment of the invention.

Terminals and network devices in TDM multi-carrier systems may allocate sub-carriers and transmit data with the frame structure of the invention. FIG. 2 illustrates a message sequence chart between a terminal and a network device according to an embodiment of the invention. In the message exchange sequence 200, the terminal 202 first performs step S210 during the uplink transmission period 120 of the first period 110, in which a probe message is sent to the network device 204 over a first set of sub-carriers, wherein the first set of sub-carriers may be all the sub-carriers in the system, or a portion of sub-carriers that the terminal 202 intends to use. Upon receipt of the probe message, the network device 204 performs step S220, in which the probe message is processed to estimate the channel characteristics for the first set of sub-carriers with respect to the terminal and the terminal 202 is allocated a corresponding set of downlink and/or uplink sub-carriers based on the estimation result, with the estimation result included in one or more allocation messages. In the downlink transmission period 130 of the first period 110, the network device 204 performs step S230, in which the allocation message is sent to the terminal 202. The sub-carrier over which the allocation message is transmitted may be one of all the sub-carriers in the system, the first set of sub-carriers, or a set of download sub-carriers allocated to the terminal 202, or may be a sub-carrier dedicated for transmission of control information defined in the system. At step S240, the terminal 202 extracts information about a set of uplink and/or downlink sub-carriers allocated to itself from the allocation message and uses it for the following data reception and transmission. In the downlink traffic transmission period 150 of the second period, the network device 204 performs step S250 in which downlink traffic is transmitted to the terminal 202 over the set of downlink sub-carriers allocated to the terminal 202. In the uplink traffic transmission period 160 of the second period, the terminal 202 performs step S260 in which the uplink traffic is transmitted to the network device 204 over its allocated set of uplink sub-carriers or a portion of sub-carriers thereof.

To obtain the channel characteristics for each sub-carrier with respect to each terminal, each terminal transmits one or more probe messages to the network device over all the sub-carriers or its respective set of sub-carriers of interest. In the uplink transmission period 120 of the first period 110, each terminal multiplexes all the sub-carriers by means of FDM (frequency division multiplex) and multiplexes all the timeslots in the uplink transmission period 120 by means of TDM.

FIG. 3A illustrates a schematic diagram in which multiple terminals transmit probe messages during the uplink transmission period 120 of the first period 110 according to an embodiment of the invention. In FIG. 3A, terminals A, B and C transmit probe messages in timeslots TS1, TS2, and TS3, respectively, according to a predefined mode. A terminal may send a probe message over all sub-carriers, for example, through data interleaving and carrier interleaving so that the probe message is distributed over all sub-carriers, or send a probe message over each sub-carrier independently. The probe message may include a predefined sequence commonly known to the network device and the terminals, such as a training sequence or the like.

FIG. 3B illustrates a schematic diagram in which multiple terminals transmit probe messages during the uplink transmission period 120 of the first period 110 according to another embodiment of the invention. As shown, different terminals use different sub-carriers in a timeslot. For example, in TS1, SC1-2 are used by terminal A, SC3-5 by terminal B and SC6-8 by terminal C; in TS2, terminals A, B and C use SC3-4, SC6-8 and SC1-2, respectively, and SC5 is idle. It may be seen from this embodiment that a terminal may transmit probe messages only over a portion of sub-carriers, for example, SC1 and SC2 are not used by the terminal B.

Optionally, all terminals should comply with a "carrier non-collision" rule to reduce conflicts and mitigate interference, that is, a sub-carrier should not be assigned to two or more terminals in the same timeslot.

Optionally, all terminals should comply with a "carrier non-overlapping" rule to improve efficiency, that is, a terminal should use different sub-carriers in different timeslots. Since the variance in the channel characteristics for the sub-carriers is slow, the performance for channel estimation will not be improved substantially even if a terminal transmits probe messages more than once over the same sub-carrier in the same timeslot.

By processing the received probe message, the network device may estimate the channel characteristics for the sub-carriers over which the probe message is transmitted with respect to the terminal which transmits the probe message, and allocate the terminal a corresponding set of downlink and uplink sub-carriers based on the channel characteristics. The allocation procedure may be based solely on the estimated channel characteristics, or with further reference to the uplink and downlink traffic of each terminal Thus, the number of uplink sub-carriers that the network device allocates to the terminal may meet the requirement for the terminal's uplink traffic exactly. Optionally, it may allocate more sub-carriers to a certain terminal or all terminals. If a terminal has no uplink traffic or downlink traffic for the moment, the network may allocate no uplink or downlink sub-carrier to the terminal.

Further, the network device packs information about a set of uplink and/or downlink sub-carriers allocated to each terminal into one or more allocation messages, for transmission to each terminal. Optionally, the sub-carrier allocation results for multiple terminals may be consolidated into a global sub-carrier allocation result and a global allocation message is generated accordingly. The global allocation message includes information about a set of uplink and/or downlink sub-carriers allocated to each terminal, and the allocation message for a single terminal includes information about a set of uplink and/or downlink sub-carriers allocated to the terminal.

In the downlink transmission period 130 of the first period 110, the network device sends an allocation message to each terminal FIG. 4A illustrates a schematic diagram in which the network device transmits allocation messages in the downlink transmission period 130 of the first period 110 according to another embodiment of the invention. The network device transmits a global allocation message to all terminals by broadcasting over all the sub-carriers or a portion of the sub-carriers. All terminals may receive the global allocation message by scanning all the sub-carriers or a dedicated sub-carrier.

FIG. 4B illustrates a schematic diagram in which the network device transmits allocation messages in the downlink transmission period 130 of the first period 110 according to another embodiment of the invention. As shown, the network device transmits allocation messages to different terminals over all or a portion of the sub-carriers, or all or a portion of the first set of sub-carriers for terminal A in different timeslots. For example, allocation messages are transmitted to terminals A, B and C in TS1, TS2 and TS3, respectively.

FIG. 4C illustrates a schematic diagram in which the network device transmits allocation messages in the downlink transmission period 130 of the first period 110 according to another embodiment of the invention. Assuming that terminals A, B and C transmit probe messages over SC1-2, SC3-5 and SC6-8 in the uplink transmission period of the first period, respectively. Then, the network device may transmit the allocation messages to terminals A, B and C over SC1-2, SC3-5 and SC6-8, respectively.

Alternatively, the network device may transmit respective allocation messages to each terminal over a set of downlink sub-carriers allocated to the terminal. In this case, these terminals may receive the allocation messages sent to them only by scanning all sub-carriers. Referring to the embodiment in FIG. 4D, it's assumed that SC2-3, SC4 and SC6-8 are allocated to terminals A, B and C, respectively. The network device transmits allocation messages to the three terminals over SC2-3, SC4 and SC6-8, respectively.

Upon receipt of an allocation message, each terminal may extract therefrom information about the set of uplink and/or downlink sub-carriers allocated to itself.

In the downlink traffic transmission period of the second period, each terminal receives downlink traffic transmitted from the network device over one or more downlink sub-carriers allocated to it. FIG. 5 illustrates a schematic diagram in which the network device transmits downlink traffic to each terminal in the downlink traffic transmission period according to another embodiment of the invention. A terminal may be allocated the same downlink sub-carriers in all timeslots in the downlink traffic transmission period, for example, terminal B is allocated SC5 and SC6 constantly. A terminal may also be allocated different downlink sub-carriers in different timeslots, for example, terminal A is allocated SC2-4 in TS1, and SC2-3 in TS2 and TS3. A sub-carrier may also be idle, rather than being allocated to any terminal. The above-mentioned information should be included in a corresponding allocation message.

Optionally, the network device need not allocate downlink sub-carriers to a terminal if the terminal has no downlink traffic in a frame. If a terminal is allocated no downlink sub-carrier, it will not perform any Rx (reception) operation during the corresponding downlink traffic transmission period.

All or at least one of the terminals may transmit uplink traffic during the uplink traffic transmission period of the second period. Similarly, a terminal allocated no uplink sub-carrier or having no uplink traffic has no need to perform Tx (transmission) operations during this period.

FIG. 6A illustrates a schematic diagram in which multiple terminals transmit uplink traffic over their respective set of uplink sub-carriers allocated to them during the uplink traffic transmission period. In this embodiment, each terminal is allocated a number of uplink sub-carriers exactly based on its uplink traffic, without any additional uplink sub-carriers. Each terminal performs uplink transmission over its allocated uplink sub-carriers. For example, the terminal B always transmits uplink traffic over SC5-6 and the terminal A transmits uplink traffic over different uplink sub-carriers allocated in different timeslots.

However, interference may occur anytime and anywhere in practical communications, which leads signals to suffer from frequency-selective fading. From the above description, uplink traffic is more susceptible to frequency-selective fading. To avoid potential frequency-selective fading, the invention further provides a method for mitigating influence from unexpected frequency-selective fading on uplink traffic transmission, in which only a portion of sub-carriers are selected for uplink transmission from multiple uplink sub-carriers allocated to a terminal, to void potential frequency-selective fading. The selection may be random or comply with a certain frequency-hop mode. Furthermore, the terminal may choose uplink sub-carriers in a hop manner based on its current uplink traffic. The precondition for the method is the number of uplink sub-carriers that the network device allocates to the terminal should not be less than the requirement for terminal's uplink traffic. FIG. 6B illustrates a schematic diagram in which the terminal carries out uplink traffic transmission with the uplink frequency selection according to an embodiment of the invention. It's assumed that terminal A obtains SC2-3 in TS1-4, terminal B obtains SC4-7 and terminal C obtains SC1 and SC8 in TS1-3. In TS4, terminal B obtains SC5-7, while terminal C obtains SC1, SC4 and SC8. It can be seen that the sub-carrier allocation here complies with the sub-carrier non-collision rule.

To avoid potential frequency-selective fading, terminal A selects SC2, SC3, SC2 and SC3 in TS1-4 for uplink traffic transmission, respectively. Similarly, terminal C selects SC1, SC8, SC1, SC4 and SC8 in TS1-4 for uplink traffic transmission, respectively.

In this embodiment, the uplink traffic of terminal B varies with time. In TS1, the terminal B uses all of the four allocated sub-carriers SC4-7; in TS2 and TS3, the terminal B uses SC4 and SC6 in TS2 due to decrease in uplink traffic, and in TS3, SC5 and SC7 are used. In TS4, the terminal B uses all of the allocated uplink sub-carriers due to increase in uplink traffic.

Figure 7:
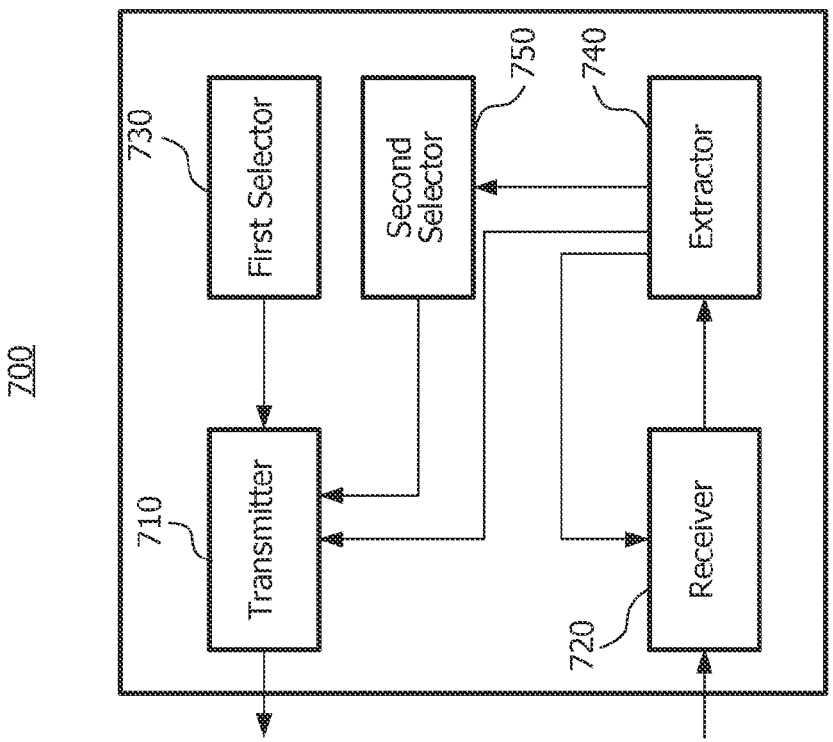
FIG. 7 illustrates the configuration of a terminal implemented according to an embodiment of the invention.

To utilize the frame structure and method of the invention, there is provided with a terminal for use in a TDM multi-carrier system. FIG. 7 shows the configuration of a terminal implemented according to an embodiment of the invention. A terminal 700 comprises a transmitter 710 for transmitting probe messages and a receiver 720 for receiving allocation messages. Optionally, the terminal 700 may further comprise a first selector 730, for selecting a set of sub-carriers that the terminal intends to use from all the sub-carriers in the TDM multi-carrier system, so as to form a first set of sub-carriers, and informing the transmitter 710 to transmit probe messages over the first set of sub-carriers. Optionally, the terminal 700 further comprises an extractor 740, for extracting information about the allocated set of uplink and downlink sub-carriers from the received allocation message. This information may be used to direct the transmitter 710 and the receiver 720 to transmit and receive traffic over a corresponding set of uplink and downlink sub-carriers, respectively. To avoid influence from potential frequency-selective fading on uplink traffic transmission, the terminal 700 further comprises a second selector 750, for selecting a second set of sub-carriers for uplink traffic transmission from the allocated set of uplink sub-carriers. The transmitter 710 may be further configured to transmit uplink traffic and the receiver 720 may be further configured to receive downlink traffic.

Figure 8:
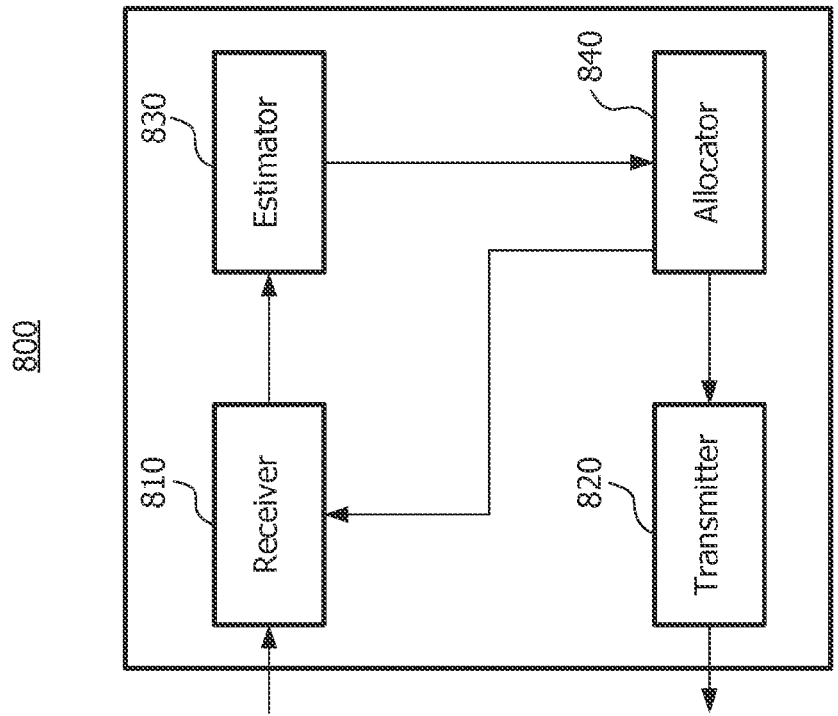
FIG. 8 illustrates the configuration of a network device implemented according to an embodiment of the invention.

To utilize the frame structure and method of the invention, there is provided with a network device for use in a TDM multi-carrier system. FIG. 8 shows the configuration of a network device implemented according to an embodiment of the invention. The network device 800 comprises a receiver 810, a transmitter 820, an estimator 830 and an allocator 840. The receiver 810 is configured to receive probe messages sent from a terminal, and may also be configured to receive uplink traffic sent from a terminal. The transmitter 820 is configured to transmit allocation messages and may also be configured to transmit downlink traffic. The estimator 830 is configured to process the received probe message, so as to estimate the channel characteristics for one or more sub-carriers which carry the probe message with respect to the terminal which transmits the probe message, to obtain an estimation result. The allocator 840 is configured to allocate a set of uplink and/or downlink sub-carriers to the terminal based on the estimation result, and generate one or more allocation messages, to be transmitted to the terminal via the transmitter 820.

Optionally, the allocator may allocate a corresponding set of uplink/downlink sub-carriers to each terminal with further reference to the uplink/downlink traffic of the terminal, the traffic level, uplink/downlink traffic of all the terminals, and other factors.

Optionally, the allocator 840 may generate a global allocation message based on the allocation result for each terminal and transmits it to each terminal via the transmitter 820.

In different systems, the network device may be a device for performing radio access estimation and/or radio resource allocation, such as a BS (base station), a MSC (Mobile Switch Center), a Node B, a RNC (Radio Network Center), an AP (Access Point), an AC (Access Controller), an AS (Access Server) or the combination thereof.

Figure 9:
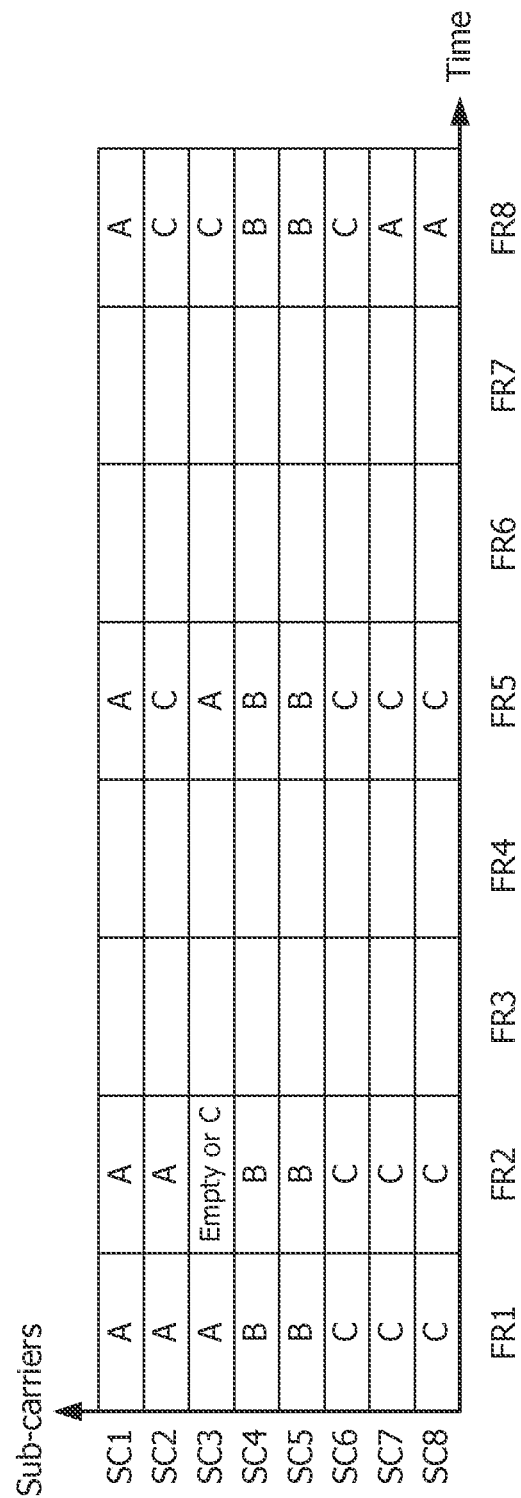
FIG. 9 illustrates an embodiment of allocating downlink sub-carriers among multiple terminals with the method of the invention.

FIG. 9 illustrates a method for sub-carrier allocation implemented according to an embodiment of the invention, which may be helpful to further illustrate the advantages of the embodiment. In FIG. 9, the vertical axis represents sub-carriers, and the horizontal axis represents time. For ease of illustration, emphasis is put only on the downlink traffic transmission period of the second period in each frame and others are omitted.

In this embodiment, it's assumed that the downlink traffic for terminal B is stable and terminal B is only interested in SC4-5. Terminals A and C are interested in all sub-carriers, and transmit probe messages over all sub-carriers.

In the first frame FR1, terminals A, B and C obtain SC1-3, SC4-5 and SC6-8, respectively. In the second frame FR2, the downlink traffic of terminal A decreases to 2 datagrams and SC3 is released accordingly. SC3 may be idle or assigned to terminal C. In the fifth frame FR5, an interference occurs to the terminal A in SC2, which causes the sub-carrier become a frequency-selective fading channel to terminal A. But due to the difference in space characteristics, SC2 is still a channel suitable for transmission to terminal C. At this time, SC3 is suitable for terminals A and C to transmit. By analyzing the probe message sent from terminals A and C during the uplink transmission period of the first period in the fifth frame, the network device allocates SC2 to terminal C, and SC3 to terminal A. In this case, the system capacity has not been reduced due to the unexpected interference. Similarly, SC3 becomes a frequency-selective fading channel for terminal A in the eighth frame, and the traffic of terminal A increases to three datagrams. By estimating the sub-carriers in the first two parts of the eighth frame, the network device allocates SC2-3 to terminal C, SC1 and SC7-8 to terminal A. It can be seen that the requirement for each terminal and the system capacity are optimized with the method of the invention. With the inventive frame structure, method and apparatus, a network device may easily obtain the global estimation result for all sub-carriers of each terminal. The global estimation result may timely and precisely reflect the channel characteristics for each sub-carrier with respect to each terminal. The network device may optimize the sub-carrier allocation in a multi-carrier system based on the global estimation result, and improve the data transmission rate for the terminal and the system performance.

It's to be understood by those skilled in the art that the frame structure, method and apparatus for sub-carrier allocation and traffic transmission as disclosed in the present invention applies not only to wireless communication networks, but also to wired-line networks based on TDM multi-carriers, such as a HFC (Hybrid Fiber Coax), and so on.

It is also to be understood by those skilled in the art that various improvements and modifications may be made to the method and apparatus for sub-carrier allocation and traffic transmission as disclosed in the present invention, especially the frame structure, method and apparatus for sub-carrier allocation and traffic transmission applicable to TDM multi-carrier systems, without departing from the basis of the invention, the scope of which is to be defined by the appended claims herein.

The invention claimed is:

1. A method for use in a mobile terminal to allocate sub-carriers in a multi-carrier system, the method comprising:
in the mobile terminal:
a transmitter transmitting a probe message to a network device over a first set of sub-carriers during an uplink transmission period of a first period, provided as part of a frame structure, wherein the probe message comprises a predetermined sequence for channel estimation and is used by the network device to perform channel estimation for the first set of sub-carriers;
a receiver receiving an allocation message sent from the network device during a downlink transmission period of the first period, the allocation message providing information to the terminal about a second set of sub-carriers allocated to the terminal by the network device which includes sub-carriers selected from among the first set of sub-carriers, and
wherein the allocation message is based on the result for channel estimation performed on the probe messages by the network device, and
wherein the frame structure comprises the first period during which a terminal transmits a probe message, during an uplink transmission period of the first period and a network device transmits an allocation message, during a downlink transmission period of the first period, and a second period, for transmitting any uplink traffic and downlink traffic between the terminal and the network device over the second set of sub-carriers allocated to the terminal.

2. The method of claim 1, wherein the terminal transmits at least one probe message over at least one of the first set of sub-carriers in a timeslot during the uplink transmission period according to a carrier non-collision rule, wherein the carrier non-collision rule defines that multiple terminals do not share a sub-carrier in a timeslot.

3. The method of claim 1, wherein the first set of sub-carriers comprises at least one of all sub-carriers in the multi-carrier system and sub-carriers that the terminal intends to use.

4. The method of claim 1, wherein receiving the allocation message comprising:
receiving the allocation message over at least one of all sub-carriers in the multi-carrier system and the first set of sub-carriers.

5. The method of claim 1, comprising:
receiving downlink traffic over the second set of sub-carriers during a downlink traffic transmission period of a second period.

6. The method of claim 1, comprising:
transmitting uplink traffic over the second set of sub-carriers during an uplink traffic transmission period of a second period.

7. The method of claim 6, comprising:
selecting the second set of sub-carriers from the set of all sub-carriers in a predefined frequency-hop mode, to avoid frequency-selective fading; and
transmitting uplink traffic over the second set of sub-carriers during an uplink traffic transmission period of a second period.

8. The method of claim 1 wherein during the second period only uplink traffic is transmitted between the terminal and the network device over the second set of sub-carriers allocated to the terminal.

9. A method for use in a network device to allocate sub-carriers in a multi-carrier system, comprising:
in the network device:
a receiver receiving a probe message sent from a terminal during an uplink transmission period of a first period, wherein the probe message is provided as part of a frame structure and wherein the probe message comprises a predetermined sequence for channel estimation; and
estimating the probe message to obtain an allocation message for the terminal, wherein the allocation message is based on information about a set of downlink sub-carriers allocated to the terminal; and a transmitter transmitting the allocation message to the terminal during a downlink transmission period of the first period, and wherein the frame structure comprises the first period during which the network device receives a probe message, during an uplink transmission period of the first period and a network device transmits an allocation message, during a downlink transmission period of the first period, and a second period, for transmitting any uplink traffic and downlink traffic between the terminal and the network device over the set of sub-carriers allocated to the terminal.

10. The method of claim 9, wherein estimating the probe message comprises:

an estimator processing the probe message to estimate channel characteristics associated with a first set of sub-carriers with respect to the terminal and obtain an estimation result for the terminal, wherein the first set of sub-carriers includes sub-carriers over which the network device receives the probe message; and generating a sub-carrier allocation result for the terminal according to the estimation result, wherein the sub-carrier allocation result includes at least one of the group of a set of uplink sub-carriers, and a set of downlink sub-carriers allocated to the terminal.

11. The method of claim 10, wherein estimating the probe message comprises:

generating a global allocation message based on a plurality of sub-carrier allocation results for a plurality of terminals, wherein the global allocation message is based on information about at least one of a group of: a set of uplink sub-carriers and a set of downlink sub-carriers allocated to each of the terminals.

12. The method of claim 10, wherein transmitting the allocation message comprises:

transmitting the allocation message to the terminal over at least one of all sub-carriers in the multi-carrier system, the first set of sub-carriers and the set of downlink sub-carriers.

13. The method of claim 9, comprising:

transmitting downlink traffic to the terminal over the set of downlink sub-carriers during a downlink traffic transmission period of a second period.

14. The method of claim 9 wherein during the second period only uplink traffic is transmitted between the terminal and the network device over the second set of sub-carriers allocated to the terminal.

15. A terminal for allocating sub-carriers in a multi-carrier system, comprising:

a transmitter, configured to transmit a probe message to a network device, wherein the probe message is provided as part of a frame structure and wherein the probe message comprises a predetermined sequence for channel estimation; and a receiver, configured to receive an allocation message sent from the network device, and wherein the allocation message is based on information about a set of sub-carriers, and wherein the allocation message is transmitted during a downlink transmission period of a first period of a frame structure, wherein the frame structure comprises the first period during which a terminal transmits a probe message, during an uplink transmission period of the first period and a network device transmits an allocation message, during a downlink transmission period of the first period, and a second period, for transmitting any uplink traffic and downlink traffic between the terminal and the network device over the set of sub-carriers allocated to the terminal.

16. The terminal of claim 15 wherein during the second period only uplink traffic is transmitted between the terminal and the network device over the second set of sub-carriers allocated to the terminal.

17. A network device for allocating sub-carriers in a multi-carrier system, comprising:

a receiver, configured to receive a probe message sent from a terminal over a set of sub-carriers, wherein the probe message is provided as part of a frame structure, wherein the probe message comprises a predetermined sequence for channel estimation, and wherein the set of sub-carriers at least includes sub-carriers that the terminal intends to use;

an estimator, configured to process the probe message to perform channel estimation for the set of sub-carriers, to obtain estimation result of channel characteristics for the set of sub-carriers with respect to the terminal;

an allocator, configured to allocate a set of sub-carriers, to the terminal based on the estimation result and generate an allocation message for the terminal, wherein the allocated sub-carriers are selected from among the sub-carriers that the terminal intends to use, and wherein the allocation message is based on information about the set of sub-carriers; and a transmitter, configured to transmit the allocation message to the terminal, and wherein the allocation message is transmuted during a downlink transmission period of a first period of a frame structure, wherein the frame structure comprises the first period during Which a terminal transmits a probe message, during an uplink transmission period of the first period and a network device transmits an allocation message, during a downlink transmission period of the first period, and a second period, for transmitting any uplink traffic and downlink traffic between the terminal and the network device over the set of sub-carriers allocated to the terminal.

18. The network device of claim 17 wherein during the second period only uplink traffic is transmitted between the terminal and the network device over the second set of sub-carriers allocated to the terminal.

19. A multi-carrier system, comprising: a processor, a memory coupled to the processor, wherein the processor is configured to generate a frame structure, the frame structure comprising: a first period, during which a terminal transmits a probe message and a network device transmits an allocation message, wherein the probe message is provided as part of a frame structure and wherein the probe message comprises a predetermined sequence for channel estimation, wherein the network device obtains the allocation message by estimating the probe message, the allocation message including information about at least one of the group of: a set of uplink sub-carriers and a set of downlink sub-carriers allocated to the terminal, wherein the allocated sub-carriers are selected from among the sub-carriers that the terminal intends to use; and a second period, during which uplink traffic and downlink traffic are transmitted between the terminal and the network device over the set of uplink sub-carriers and the set of downlink sub-carriers, and wherein the allocation message is based on the result for channel estimation performed on the probe message by the network device.

20. A method for use in a mobile terminal to allocate sub-carriers in a multi-carrier system, the method comprising:

in the mobile terminal:
a transmitter transmitting a probe message to a network device over a first set of sub-carriers during an uplink transmission period of a first period, provided as part of a frame structure, wherein the probe message is used by the network device to perform channel estimation for the first set of sub-carriers; and
a receiver receiving an allocation message sent from the network device during a downlink transmission period of the first period, the allocation message providing information to the terminal about at least a set of selected sub-carriers allocated to the terminal by the network device from among the first set of sub-carriers, wherein the allocation message is based on the result for channel estimation performed on the probe message by the network device;
the receiver receiving downlink traffic over at least one sub-carrier of the set of downlink sub-carriers during a downlink traffic transmission period of a second period;
a second selector selecting a second set of sub-carriers from the set of uplink sub-carriers in a predefined frequency-hop mode, to avoid frequency-selective fading; and
the transmitter transmitting uplink traffic over the second set of sub-carriers during an uplink traffic transmission period of a second period, and
wherein the frame structure comprises the first period during which a terminal transmits a probe message, during an uplink transmission period of the first period and a network device transmits an allocation message, during a downlink transmission period of the first period, and a second period, for transmitting any uplink traffic and downlink traffic between the terminal and the network device over the sub-carriers allocated to the terminal.

21. The method of claim 20 wherein selecting the second set of sub-carriers is based on the terminal's uplink traffic.

22. The method of claim 20 wherein during the second period only uplink traffic is transmitted between the terminal and the network device over the second set of sub-carriers allocated to the terminal.

23. A multi-carrier system, comprising: a processor,
a memory coupled to the processor, wherein the processor is configured to generate a frame structure to allocate transmission times in the multi-carrier system, the frame structure comprising: a first period, during which a terminal transmits a probe message and a network device transmits an allocation message, wherein the probe message is provided as part of a frame structure and wherein the probe message comprises a predetermined sequence for channel estimation, and wherein the network device obtains the allocation message by estimating the probe message, the allocation message is based on information about at least one of the group of: a set of uplink sub-carriers and a set of downlink sub-carriers allocated to the terminal; and a second period, during which uplink traffic and downlink traffic are transmitted between the terminal and the network device over at least one of the group of: the set of uplink sub-carriers and the set of downlink sub-carriers, and wherein the first period, further comprises: an uplink transmission period, during which the terminal transmits the probe message to the network device; and a downlink transmission period, during which the network device transmits the allocation message to the terminal and a guard period, inserted between the uplink transmission period and the downlink transmission period of the first period.

* * * * *